Oct. 27, 1959          G. G. LA PORTE          2,910,038
OIL TESTING AND INDICATING SYSTEM FOR AUTOMOBILE ENGINES
Filed Jan. 10, 1958          2 Sheets-Sheet 1
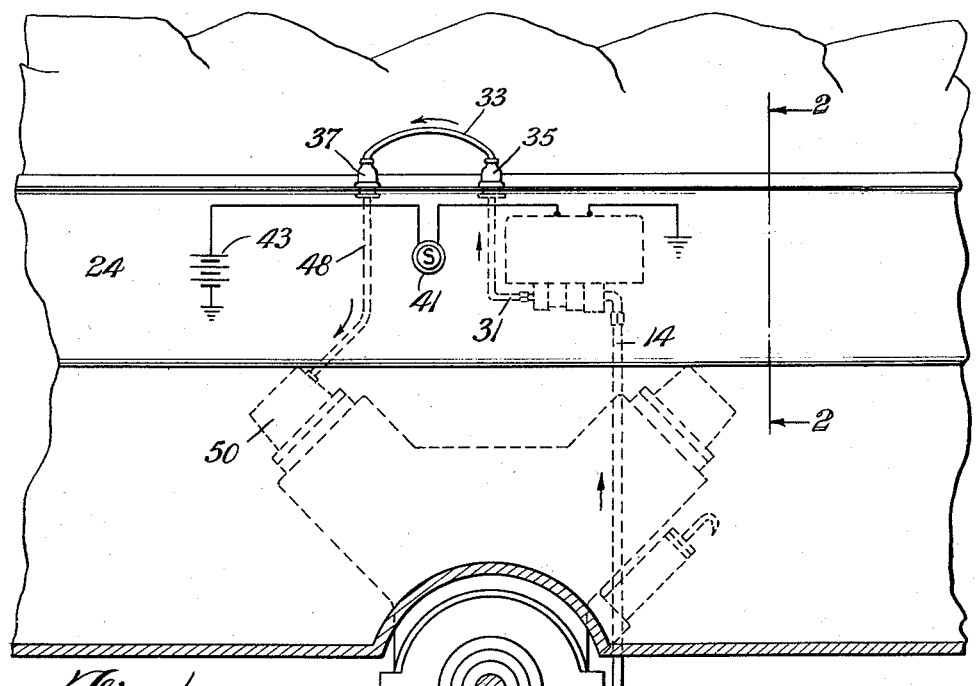
Fig. 1.
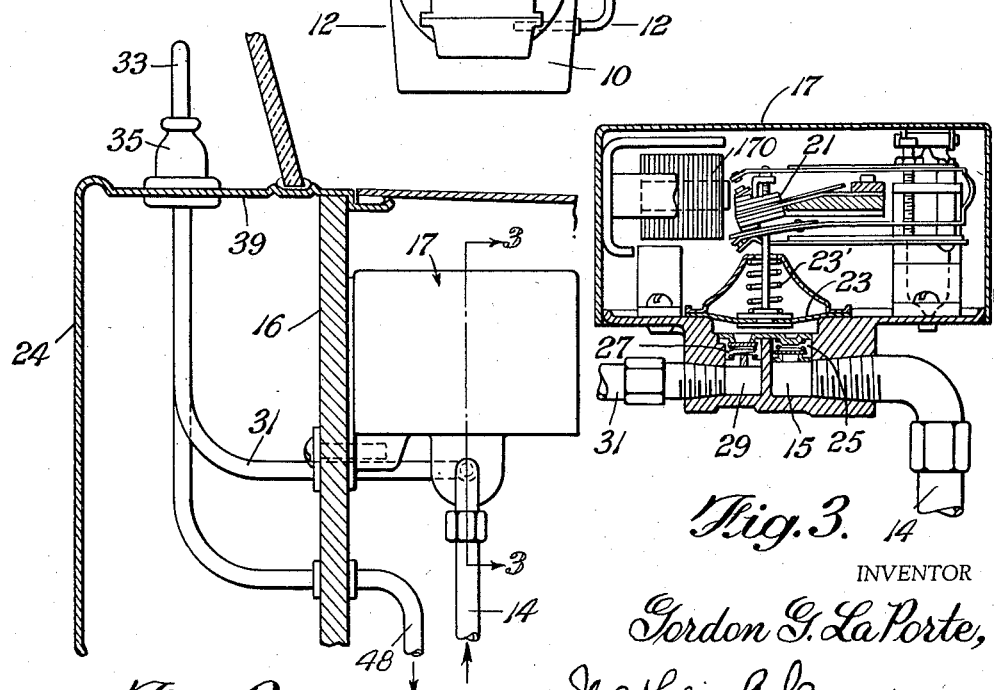
Fig. 2.
Fig. 3.
INVENTOR
Gordon G. La Porte,
BY Nathan A. Conn
ATTORNEY Oct. 27, 1959 G. G. LA PORTE 2,910,038
OIL TESTING AND INDICATING SYSTEM FOR AUTOMOBILE ENGINES
Filed Jan. 10, 1958 2 Sheets-Sheet 2
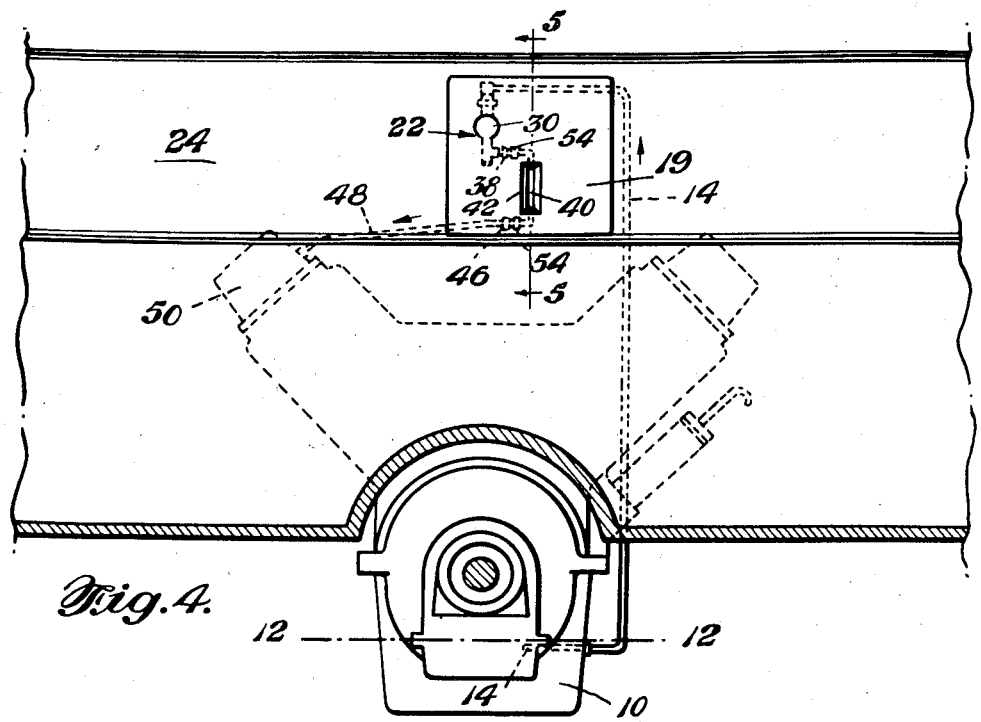
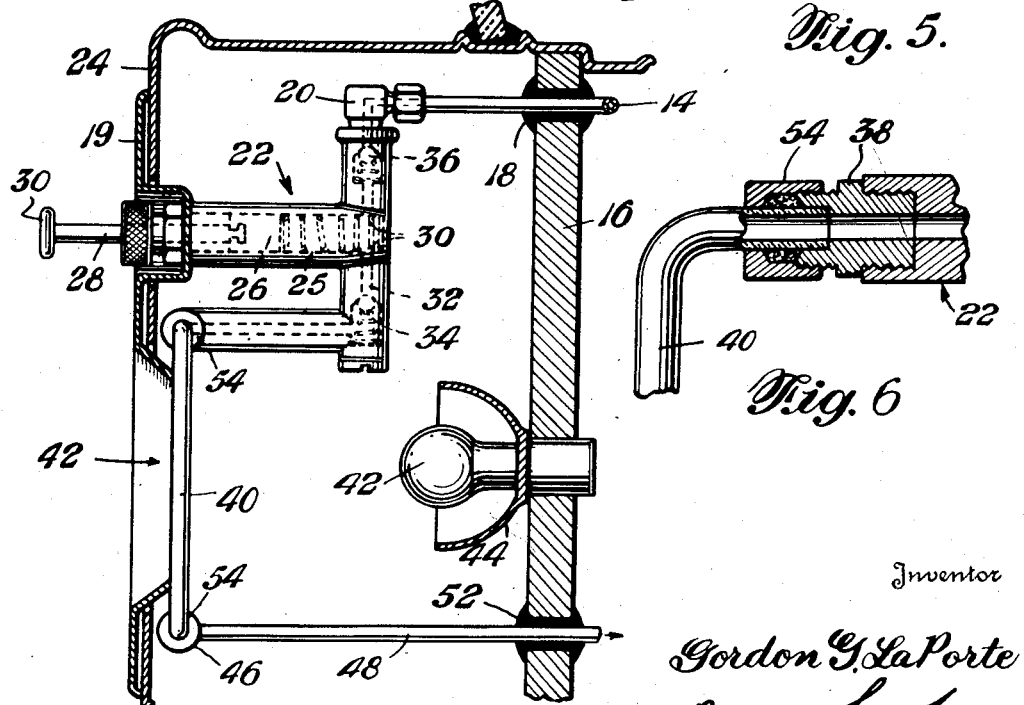
Inventor
Gordon G. La Porte
Attorney

United States Patent Office 2,910,038
Patented Oct. 27, 1959

2,910,038

OIL TESTING AND INDICATING SYSTEM FOR AUTOMOBILE ENGINES

Gordon G. La Porte, Tupper Lake, N.Y.

Application January 10, 1958, Serial No. 708,157

3 Claims. (Cl. 116—118)

This invention relates to systems for testing and indicating the condition of the oil in the crankcase of an automobile engine, particularly to a system including devices for affording to the driver a reliable indication of the condition of the oil in the crankcase in regard to undue contamination as well as to its safe level in the crankcase.

This application is a continuation-in-part of my prior application Serial No. 590,743, filed June 11, 1956.

In devices prior to the present invention, designed for indicating to the driver of an automobile the condition of the oil in the crankcase, various elements of unreliability prevented their acceptance by the automobile industry. Either the level indication of the oil in the crankcase would be inaccurate or else indication of the condition of the oil as to contamination would be unreliable, or defects in the system would be apt to cause trouble for the driver.

According to my invention means is arranged easily accessible to the driver while sitting in his seat, to actuate reliably operating means for passing a sample of the oil in the crankcase through a sight tube in plain view for him to inspect, said means being adapted to continue to pass a flow of the oil for any length of time at the option of the driver until he is satisfied that he has a reliable indication by the color of the oil that it is sufficiently free from contamination. The means for producing the flow of oil is so chosen as to be free from danger of causing any undue pressures in the ducts leading to the sight tube.

The oil is conducted from a point located adjacent the minimum safe level of the oil in the crankcase and after passing through the sight tube is conducted for return to the crankcase by way of an adjacent part of the engine requiring lubrication, as, for example, the valve rocker chamber of the engine. By reason of such location of the oil inlet adjacent the safe level of the oil in the crankcase an indication of the necessary amount of oil being present in the crankcase is given to the driver as well as the condition thereof.

In the accompanying drawings, illustrating preferred embodiments of my invention.

Fig. 1 is a diagrammatic fragmental sectional elevational view of a portion of the interior of an automobile with my improved testing and indicating system applied thereto;

Fig. 2 is a fragmental cross-sectional elevational detail view on an enlarged scale, the section being taken on the line 2—2 in Fig. 1;

Fig. 3 is a central sectional elevational view of the diaphragm pump preferably used in my improved system, the section being taken along line 3—3 in Fig. 2;

Fig. 4 is a fragmental elevational view of a portion of the interior of an automobile illustrating another embodiment of my improved system;

Fig. 5 is a sectional side elevational detail view, on a larger scale, the section being taken on line 5—5 of Fig. 4; and Fig. 6 is a sectional detail view illustrating on an enlarged scale the junction of the sight tube to the pump shown in Fig. 5.

Referring in detail to the drawings, particularly to the embodiment of the invention illustrated in Figs. 1–3, the crankcase wall 10 of an automobile engine of a standard type is formed with an aperture adjacent to the permissible minimum safe level 12—12 of the oil therein. Through this aperture in wall 10 a pipe 14 is entered in oil-tight relation therewith. Pipe 14 communicates with the intake chamber 15 of an electromagnetically operated diaphragm pump 17 of a known type, such, for example, as shown in Patent No. 2,169,827, dated August 15, 1939. Such a pump may be attached in any convenient point, preferably to the bulkhead 16 of the automobile suitable for convenient connection to the various elements of my improved system. The pump is actuated by means of an electromagnet 170, which is alternately energized and deenergized by a make-and-break connection operated by the alternate attraction and release of an armature 21 vibrating in accordance with the fluctuation of the electric current through the winding of electromagnet 170. A diaphragm 23 is connected to armature 21 to vibrate therewith, so as to subject the space below the diaphragm to suction on the upstroke of the armature, thereby opening a valve 25 which is normally biased to close chamber 15. This suction communicating with pipe 14 sucks a charge of oil into the space below diaphragm 23. Then, on the downstroke of diaphragm 23, pressure is exerted by spring 23' to force the charge of oil past a normally closed, spring biased valve 27, into chamber 29, communicating with a pipe 31, leading to sight tube 33. Pipe 31 passes from the discharge portion of pump 17 through bulkhead 16, thence through wall 39 of instrument panel 24 in front of the driver. Suitable union means 35 may be used for attaching the extremity of pipe 31 to wall 39 and for coupling it to one end of sight tube 33. The other end of sight tube 33 is coupled to similar union means 37 for coupling the sight tube to pipe 48, the upper end of which passes up through wall 39 and the lower end of which leads into the adjacent valve rocker chamber enclosed by cover-plate 50.

Sight tube 33 may conveniently be formed of transparent plastic tubing which may be readily bent to engage union couplings 35 and 37 to be clamped thereby in secure coupling relation with pipes 31 and 48. Thus the sight tube may be readily removed for cleaning or replacement without requiring any special tools.

Should the driver, at any time while driving, desire to test the condition of the oil in the crankcase and/or to ascertain whether the oil in the crankcase is still above the minimum safe level, he closes a switch 41, disposed at a convenient place on panel 41 to complete an electric circuit through a line leading from battery 43 through electromagnet 170. Energization of electromagnet 170 attracts armature 21, causing it to swing upward carrying with it diaphragm 23 to exert suction force on chamber 15 so as to suck the fluid contents thereof, oil or air, past valve 25. At the end of the upward swing of the armature the electric circuit is automatically broken, permitting spring 23 to force diaphragm 23 down to its initial position, closing valve 25 and forcing the previously sucked up fluid charge past valve 27 into pipe 31. The return of armature 23' to its lowered position in the meantime reestablishes the electric circuit, thus repeating the cycle of rapidly raising and lowering diaphragm 23 to force repeated charges of fluid into pipe 31 leading past sight tube 33. After a few vibrations of the diaphragm, effecting discharge of any air which may be in the pipes, a flow of oil will be obtained through sight tube 33, discharging through pipe 48 into valve rocker chamber enclosed by cover 50, and returned therefrom into the crankcase through the usual ducts provided therefor in the engine construction of the type diagrammatically illustrated. Switch 41 is maintained closed so as to cause the pump 17 to pump oil through sight tube 33 until the driver is satisfied that he has a reliable indication of the color of the oil in the crankcase. From the color of the oil the driver can readily judge whether the oil is so contaminated as to require changing. Of course, if the level of the oil has dropped below its minimum safe level, no oil will pass through the sight tube, thus providing a reliable indication that additional oil should be supplied into the crankcase.

As hereinabove indicated, union couplings 35 and 37 are readily operable without requiring any special tools. It is evident therefore that, should it be desired to remove a sample of oil from the crankcase for closer observation of its condition, this may be readily done by merely operating union coupling 37 to detach the adjacent end of sight tube 33 and pour any desired amount of oil into a container for observation or test by merely turning on switch 41 to set pump 17 into operation for the required length of time. In fact all of the oil in the crankcase down to level 12—12 may be so discharged, if desired, for the purpose of subsequently refilling with fresh oil.

It will be readily seen that the pressure exerted by the pump in forcing the oil through the sight tube is limited by the force which can be exerted by the spring 23'. This force as a rule is limited to about four pounds or less per square inch, and therefore exerts no undue pressure on sight tube and its connections on the instrument panel.

Referring now to the embodiment of the invention in the system illustrated in Figs. 4 to 6, Fig. 4 illustrates diagrammatically a fragmental elevation of the interior of an automobile showing in outline an automobile engine of a known type having a crankcase 10 requiring an oil level having a minimum indicated by the line 12—12. To test this level, a tube 14 is introduced into the crankcase, as through a hole drilled in the side of the casing, at a point adjacent the minimum permissible level, so that the mouth of the entering tube terminates at that level. Tube 14 extends upwardly and passes through a resilient bushing 18 disposed in a perforation in bulkhead 16 for connection to the inlet end 20 of a hand operated suction pump 22 attached to the rear of instrument panel 24, in any suitable manner. Preferably a cover plate 19, mounted on intrument panel 24, has a portion passing through a slot in the panel wall, providing a portion to which pump 22 may be attached.

Suction pump 22 is formed with a cylinder 25 in which is disposed for reciprocation a piston 26, operated by stem 28 extending through the instrument panel and terminating in an operating button 30. The plunger is held in retracted position by a spring 31. Thus for operating the pump the operator, sitting in his seat in the automobile, merely presses button 30 to advance piston 26 and then releases the button, allowing spring 31 to return the piston. At each forward movement of the piston any air or oil in cylinder 25 is forced out through duct 32 past check valve 34, and on the return of the piston by spring 31 suction is exerted to suck in air or oil past upper check valve 36 opening downwards into duct 32. In this way the operator by pushing button 30 several times exhausts the air from tube 14 and, if there is sufficient oil in crankcase 10 so as to maintain a level above the lowest permissible level, oil will be sucked up by pump 22 and forced past check valve 34.

The exit end of pump 22 is connected by means of a packing gland 38 to a transparent sight tube 40, disposed close to a corresponding slot 42 formed in cover plate 19. Thus when the oil is forced past check valve 34 it enters sight tube 40 visible to the operator and gives an indication that the oil in the crank case is above the permissible minimum level. Should no oil be visible in sight tube 40 after several reciprocations of piston 26 by pressing button 30, the operator is put on notice that the oil in the crankcase is insufficient for safety and requires replenishing.

In addition to giving him information in regard to the level of the oil the operator may also determine the condition of the oil, as to its clearness, indicating whether the oil has accumulated sludge due to its repeated use, thus requiring a change of oil. To facilitate the inspection of the condition of the oil a light 42 with a reflector 44 is provided to throw a beam of light through sight tube 40, illuminating the same so that the degree of translucence or opacity of the oil in the sight tube can be readily determined.

For disposing of the oil passing through the sight tube, the lower extremity of the latter is connected in a suitable manner, as by a packing gland 46, to a tube 48, passing back through bulkhead 16 and discharging into the valve rocker chamber enclosed by cover plate 50. Thus any oil entering sight tube 40 is readily drained and does not interfere with the accuracy of any subsequent test. A suitable resilient bushing 52 may be supplied for the tube to provide a tight cushioned fit for tube 48 similar to that produced by bushing 18 for tube 14.

Should it be desired to clean sight tube from time to time, so as to restore its orginal transparency, in the event that the repeated tests of the oil has left any sludge coating on the interior walls of the tube, the latter may be readily removed by manipulating the knurled nuts 54 to disengage the same from the mating units of the respective glands. Thus the sight tube may be readily detached without requiring any special tools for this purpose.

In both forms of the invention the oil pump, whether it be an electromagnetically operated vibrating diaphragm type, or whether it be a hand pump requiring manual reciprocation, circulates oil through a sight tube for a length of time at the option of the driver, sufficient to give him a reliable indication of the condition of the oil in the crankcase as well as the minimum safe level thereof. All the oil that passes through the sight tube is returned to the engine, while at the same time the pressure forces exerted are sufficiently small so as not to endanger any leakage of oil through the connections on the instrument panel by reason of excessive oil pressure. The color of the oil visible through the transparent sight tube affords a reliable indication of the condition of the oil, inasmuch as sufficient flow may be obtained at the will of the driver in accordance with the time that the pump is operated.

It is evident that, if desired, the sight tube in the embodiment illustrated in Figs. 1 to 3 may also be illuminated as disclosed in the form illustrated in Figs. 4, 5.

Although I have shown two embodiments of my invention it will be obvious that variations may occur to persons skilled in the art without departing from the spirit of the invention and the scope thereof as defined in the appended claims.

What I claim and desire to secure by Letters Patent is:

1. A system for indicating the condition of the oil in the crankcase of an engine in an automotive vehicle comprising a conduit line having an oil inlet located adjacent a point of safe level of the oil in the crankcase, and an oil outlet discharging into an oil chamber of the engine for return of the oil to the crankcase, a slight tube in said conduit disposed in the vehicle in plain view of the driver, a low pressure oil pump disposed in said conduit line adapted for operation at the option of the driver independently of the engine operated oil circulating pump for alternately applying suction to the inlet end of the conduit line and a limited amount of pressure to the outlet end of the conduit line for forcing successive amounts of oil at a low pressure from the crankcase through the sight tube for discharge into said oil chamber, said oil pump being adapted to be operated by the driver for producing a flow through said sight tube for a sufficient length of time for affording a reliable indication of the condition of the oil in the crankcase.

2. A system as defined in claim 1, in which said oil pump is an electromagnetically operated vibrating diaphragm type, an electric circuit including means for automatically alternately energizing and deenergizing the pump electromagnet, and switch means disposed in the vehicle at a point convenient to the driver for closing the electric circuit for operating the pump.

3. A system as defined in claim 1, in which said sight tube is of transparent flexible material, bendable so as to be readily attachable and detachable for cleaning.

References Cited in the file of this patent
UNITED STATES PATENTS

| | | |
|---|---|---|
| 2,169,827 | Whitted | Aug. 15, 1939 |
| 2,593,172 | Neumann | Apr. 15, 1952 |
| 2,791,197 | Wylie | May 7, 1957 |
| 2,840,035 | La Porte | June 25, 1958 |